US008874551B2

(12) United States Patent
Rosjat et al.

(10) Patent No.: US 8,874,551 B2
(45) Date of Patent: Oct. 28, 2014

(54) DATA RELATIONS AND QUERIES ACROSS DISTRIBUTED DATA SOURCES

(75) Inventors: Martin Rosjat, Dresden (DE); Stefan Hesse, Dresden (DE); Eugen Frank, Freital (DE)

(73) Assignee: SAP SE, Walldorf (DE)

( * ) Notice: Subject to any disclaimer, the term of this patent is extended or adjusted under 35 U.S.C. 154(b) by 73 days.

(21) Appl. No.: 13/467,190

(22) Filed: May 9, 2012

(65) Prior Publication Data
US 2013/0304724 A1 Nov. 14, 2013

(51) Int. Cl.
G06F 17/30 (2006.01)

(52) U.S. Cl.
CPC .............................. G06F 17/30867 (2013.01)
USPC .......................................... 707/722; 707/714

(58) Field of Classification Search
USPC ......... 707/104, 760, 722, 752, 714, 769, 705, 707/102
See application file for complete search history.

(56) References Cited

U.S. PATENT DOCUMENTS

| | | | |
|---|---|---|---|
| 6,457,020 B1 * | 9/2002 | Carey et al. ................... 707/714 |
| 7,483,923 B2 * | 1/2009 | Novik .................................. 1/1 |
| 7,937,387 B2 * | 5/2011 | Frazier et al. ................. 707/722 |
| 8,131,744 B2 * | 3/2012 | Dettinger et al. ............. 707/760 |
| 2002/0133504 A1 * | 9/2002 | Vlahos et al. ............. 707/104.1 |
| 2006/0212486 A1 * | 9/2006 | Kennis et al. ................. 707/200 |
| 2007/0038610 A1 * | 2/2007 | Omoigui ............................ 707/3 |
| 2009/0037430 A1 * | 2/2009 | Mukkamala et al. ........... 707/10 |
| 2009/0157727 A1 * | 6/2009 | Paila .............................. 707/102 |
| 2010/0036788 A1 * | 2/2010 | Wu et al. ........................... 706/47 |
| 2011/0153636 A1 * | 6/2011 | Coldicott et al. ............. 707/769 |
| 2011/0173213 A1 * | 7/2011 | Frazier et al. ................. 707/752 |
| 2013/0006968 A1 * | 1/2013 | Gusmini et al. .............. 707/722 |
| 2013/0041888 A1 * | 2/2013 | Eisner et al. ................. 707/722 |
| 2013/0275164 A1 * | 10/2013 | Gruber et al. ...................... 705/5 |

OTHER PUBLICATIONS

World Wide Web Consortium (W3C), "OWL Web Ontology Language Overview," Feb. 2004, retrieved on Oct. 19, 2010 from www.w3.org/TR/owl-features/, 18 pages.
World Wide Web Consortium (W3C), Resource Description Framework (RDF), Feb. 2004, retrieved on Nov. 29, 2012 from www.w3.org/RDF/, 3 pages.
World Wide Web Consortium (W3C), "SPARQL Query Language for RDF," Jan. 2008, retrieved on Nov. 29, 2012 from www.w3.org/TR/rdf-sparql-query/, 81 pages.

(Continued)

Primary Examiner — James Trujillo
Assistant Examiner — Thong Vu
(74) Attorney, Agent, or Firm — Fish & Richardson P.C.

(57) ABSTRACT

Methods, systems, and computer-readable media include actions of receiving a query, identifying, based on the query, one or more relevant elements from an overall data model, identifying, using an adapter mapping, one or more adapters based on the one or more relevant elements, the adapter mapping associating each relevant element with a particular adapter, querying, using the one or more adapters, one or more data elements in data sources of a plurality of disparate data sources, each adapter being specific to a data source of the plurality of data sources, receiving, at the one or more adapters, one or more data results, transforming each data result of the one or more data results into a unified data format to provide respective one or more transformed data results, storing the one or more transformed data results in a temporary data store and querying the temporary data store to generate a result.

20 Claims, 6 Drawing Sheets

(56) References Cited

OTHER PUBLICATIONS

Tim Berners-Lee, "Relational Databases and the Semantic Web (in Design Issues)," Sep. 1998, retrieved from www.w3.org/DesignIssues/RDB-RDF.html, 6 pages.

D2RQ, "D2R Server: Accessing databases with SPARQL and as Linked Data," retrieved on Nov. 29, 2012 from http://d2rq.org/d2r-server, 12 pages.

World Wide Web Consortium (W3C), "Linked Data," retrieved on Nov. 29, 2012 from www.w3.org/standards/semanticweb/data, 3 pages.

* cited by examiner

DATA RELATIONS AND QUERIES ACROSS DISTRIBUTED DATA SOURCES

BACKGROUND

Digital information can be electronically stored in different data formats (e.g., integer, double, text, binary) and different data structures. Further, digital information can be stored across distributed systems, such as relational databases, object oriented databases, files, web services, devices, programs and applications systems. Relations between the data stored over distributed systems can be missing. That is, there is no uniform data model as well as single-entry and homogenous access to this distributed data.

For example, supply chain management requires information from multiple parts of the manufacturing environment, which use different information systems, databases, and machines. For example, current orders can be stored in particular relational databases, while the machine status can only be retrieved through a web service call. This distribution and heterogeneity of the data make it difficult for the personnel in charge, such as the production manager or resource planner, to have an overview of the current process.

SUMMARY

Implementations of the present disclosure include computer-implemented methods querying distributed data sources that include actions of receiving a query, identifying, based on the query, one or more relevant elements from an overall data model stored in computer-readable memory, identifying, using an adapter mapping, one or more adapters based on the one or more relevant elements, the adapter mapping associating each relevant element with a particular adapter, querying, using the one or more adapters, one or more data elements in the data sources of the disparate data sources, each adapter being specific to a data source of the one or more data sources, in response to querying, receiving, at the one or more adapters, one or more data results, transforming each data result of the one or more data results into a unified data format to provide respective one or more transformed data results, storing the one or more transformed data results in a temporary data store, and querying the temporary data store to generate a result.

In some implementations, the data model is provided as an ontology and comprises a plurality of interconnected data elements, data associated with each data element being provided in a respective data source of the disparate data sources.

In some implementations, the data model is processed to provide a usable representation.

In some implementations, processing of the data model includes converting the data model into a plurality of business object class instances.

In some implementations, the adapter mapping maps the one or more adapters to respective one or more data model classes identified from the query.

In some implementations, each adapter is provided as a generic adapter and is configured to be specific to a data source type of the one or more data sources based on one or more configurations.

In some implementations, the one or more configurations are provided in a configuration file.

In some implementations, the one or more configurations identify a location of a respective data source, to which the respective adapter is specific.

In some implementations, the one or more configurations include credentials that can be used to access a respective data source.

In some implementations, the unified data format includes resource description framework (RDF) format and the temporary data store comprises an RDF data store.

In some implementations, the disparate data sources include one or more of an RDF data source that stores data in RDF format, an extensible mark-up language (XML) data source that stores data in XML format, a web service (WS) data source that stores data provided web service description language (WSDL) and a relation database that stores data in one or more tables.

In some implementations, the query is provided as a SPARQL query.

In some implementations, the temporary data store is queried using the query.

In some implementations, each adapter generates a data source-specific query and queries a respective data source using the data source-specific query.

In some implementations, actions further include providing the result to querying computer-executed application that submitted the query.

In some implementations, identifying, using the adapter mapping, one or more adapters based on the relevant elements includes: for each relevant element of the one or more relevant elements, identifying one or more data source locators to provide a list of data source locators, providing the list of data source locators as input to the adapter mapping, and receiving a list of adapters from the adapter mapping, the list of adapters including the one or more adapters.

In some implementations, the data source locators comprise uniform resource indicators (URIs).

In some implementations, the adapter mapping comprises an index associating adapters to respective data source locators.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to retrieving data from distributed, heterogeneous data sources using a uniform data and structure model (uniform data model). In particular, implementations of the present disclosure improve the management of different types of data providing a homogenous mechanism to access and query data over distributed data sources. More particularly, the uniform data model can be provided as an ontology that defines classes and properties of classes. In some examples, properties include attributes of classes and relationships between classes. The uniform data model can further identify instances of the classes and/or properties, the instances including data provided in one or more of the distributed, heterogeneous data sources. In this manner, an element mapping can be provided that maps elements of the uniform data model to data sources (elements of data source schemas) within which data instances are stored.

Implementations of the present disclosure further provide an integrated system that operates as a mediator between one or more applications and the distributed, heterogeneous data sources. In some examples, the integrated system uses mappings to identify one or more adapters that enable communication between the integrated system and respective data source type. Each adapter is specific to a data source type. In some examples, each adapter can be provided as a generic adapter that is configured to be specific to a respective data source type, providing an adapter instance. The adapter instances, hereinafter simply referred to as "adapters," enable the retrieval of data from the respective data sources and transformation of the retrieved data from a native format (e.g. data source schema) of the data source to a unified data format. The transformed data can be stored in a temporary data store of the integrated system and can be provided to the one or more applications.

Accordingly, implementations of the present disclosure enable connections to heterogeneous data sources and data retrieval using a single-point of entry. Specifically, implementations of the present disclosure provide a homogenous mechanism to access and query data over distributed data sources based on a uniform data model. New information (e.g. relations between data elements of different systems) can be generated out of individual data stored in distributed data sources, while the data in original data sources remains unchanged. The underlying data model is flexible such that modifications and extensions are possible (e.g., changing relations between data in the data model and/or adding a new data source).

Figure 1:
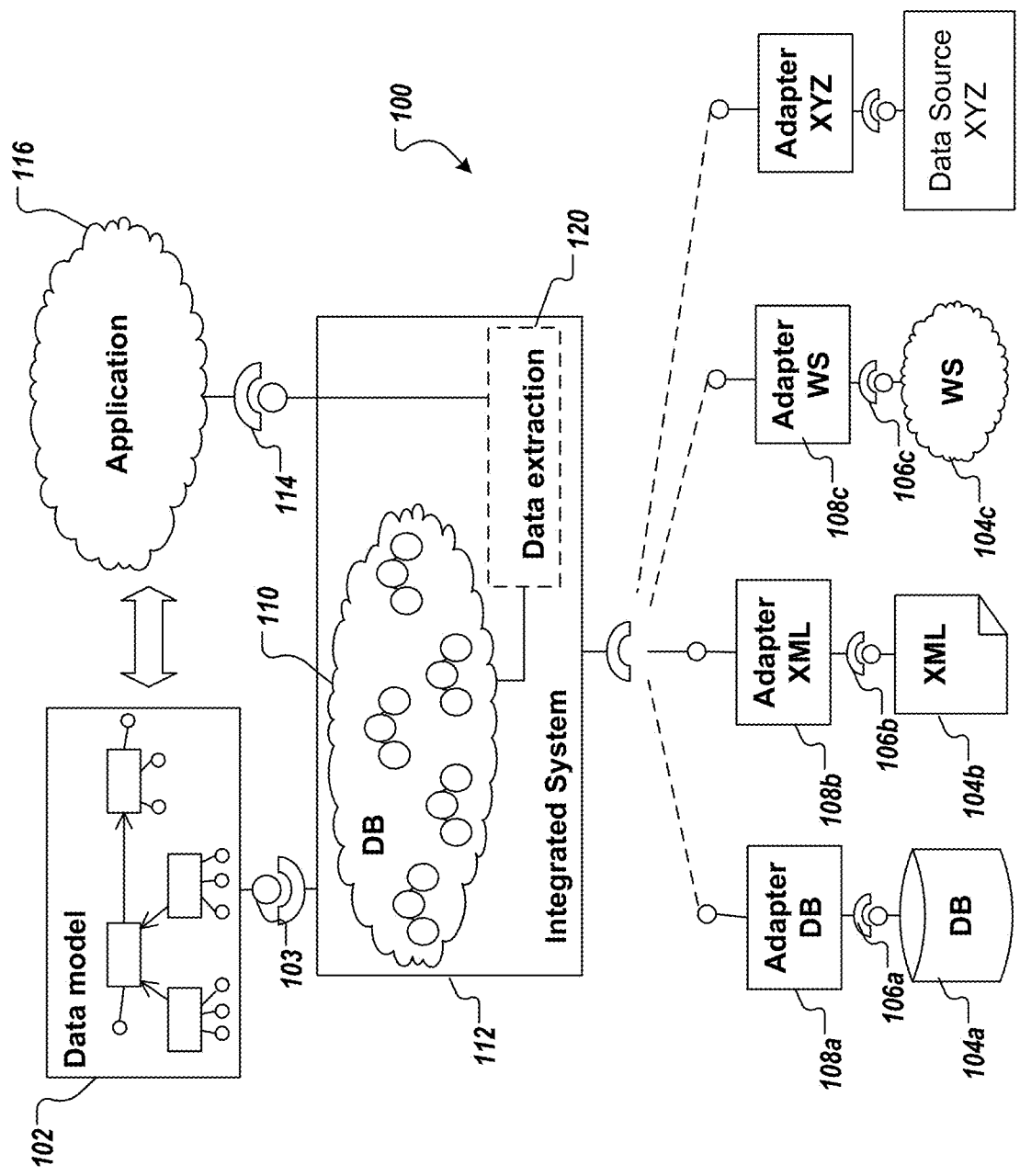
FIG. 1 is a block diagram of an example system architecture that can execute implementations of the present disclosure.

FIG. 1 depicts an example system architecture 100 that can execute implementations of the present disclosure. In some implementations, the system 100 includes a data model 102, an integrated system 112, an application 116 and data sources 104a, 104b, 104c. In some examples, the application 116 can query the integrated system 112 through an interface 114. In response to the query, the integrated system 112 accesses the data model 102 through an interface 103. In some examples, the integrated system 112 accesses the data sources 104a, 104b, 104c through respective adapters 108a, 108b, 108c. In some examples, the data sources 104a, 104b, 104c are heterogeneous data source types, where each data source stores data in a particular data format that may be different than data formats of one or more other data sources. In some implementations, the adapters 108a, 108b, 108c communicate with the data sources 104a, 104b, 104c through respective interfaces 106a, 106b, 106c.

In the depicted example, the data source 104a is provided as a database (DB) data source which stores data in a relational database tables. In the depicted example, the data source 104b is provided as an extensible mark-up language (XML) data source that stores data in XML format, and the data source 104c is provided as a web service (WS) data source (e.g., data format provided through web service description language (WSDL) file). Implementations of the present disclosure are applicable to other data sources including, for example RDF Store, REST services.

In some implementations, the data model 102 can be provided as a semantic data model provided as an ontology. In some examples, the data model 102 can specify relationships between classes, sub-classes and attributes. In this manner, the data model 102 enables existing dependencies between defined complex data types to be described. This can be defined independently from the structure description and can be separately persisted in computer-readable memory. In this manner, the integrated system 112 is able to automatically resolve application-specific relationships in underlying data sources (e.g., data sources 104a, 104b, 104c).

In some implementations, the integrated system 112 includes a data store 110 and a data extraction component 120. In some examples, the data store 110 can be associated with a unified data format. An example unified data format can include RDF. Generally, RDF includes features that support the evolution of the data models over the time without requiring all the data mappings to be changed (e.g. adding new elements in the data model or dependencies between data elements). A benefit of using RDF is that the data set is available in a unified format, as data tuples (e.g., a triple including subject, predicate and object). In some examples, the data tuples can be generated by means of the data model mapping and filled with values of the data instances through the adapters. In some examples, each resource (data source) and data within the resource is defined by respective uniform resource indicators (URIs). Each declaration of a resource can be expressed as a triple. In some examples, the subject defines the resource URI, the predicate the attribute URI and the object defines the value of the attribute.

In some implementations, the integrated system 112 can act as a mediator between applications (e.g., the application 116) and data sources (e.g., the data sources 104a, 104b, 104c). In some examples, the integrated system 112 can control the communication, data retrieval and transformation of individual data sets retrieved from the data sources. In some examples, the integrated system 112 can receive a query (e.g., from the application 116) and can generate one or more queries to request particular data from the data sources. In some implementations, the data source 104a, 104b, 104c are accessed via the respective data source adapters 108a, 108b, 108c. For example, the data source 104b can store data in an extensible mark-up language (XML) format (XML data) and can be accessed by the adapter 108*b* (e.g., XML-specific adapter).

In some implementations, an adapter is allocated for each corresponding data source. The adapter has a data source mapping (discussed in further detail herein) that maps data provided in the data source to the overall data model (e.g., column abc of a database table is mapped to an object attribute xyz in the data model). In some implementations, the adapters handle the specific authentication and connection details of different data sources, as discussed in further detail below with reference to FIG. 2. That is, for example, an adapter can provide appropriate credentials for authenticating and authorizing access to a respective data source. Each adapter can be initially provided as a generic adapter that is configured for a specific data source using one or more configurations files. In some examples, the configuration files can define one or more URIs associated with the data source and/or data stored within the data source, and can provide credentials (e.g., username and password) to enable access to the data source. In some examples, the configurations files can further include a mapping for transforming the native format of the data source to the unified format.

During runtime of the architecture 100, the application 116 can submit a query to the integrated system 112. In some examples, the query can be provided in a query language. An example query language can include the SPARQL Protocol and Query Language for RDF (SPARQL). The integrated system 112 can process the query in view of the data model 102 and can generate one or more data source calls. In some examples, each data source call can be specific to a data source (e.g., one of the data sources 104*a*, 104*b*, 104*c*) based on the data that is requested. The integrated system 112 can provide the one or more data source calls to the respective adapters (e.g., the adapters 108*a*, 108*b*, 108*c*), which directly query the respective data sources to retrieve data therefrom. In some examples, the data source calls can be provided in respective data source-specific query formats (e.g., SQL query or Web Service call).

The data retrieved from the data sources is transformed into the internal unified format. As noted above, and by way of non-limiting example, the internal format can be RDF, which enables data from the data sources to be transferred to the data store as data tuples (e.g., triples provided in the form of subject-predicate-object) regardless of the original data format. The data tuples can be generated by the respective adapters 108*a*, 108*b*, 108*c* and filled with values of the data instances queried over the adapters. The original query (e.g., SPARQL query) received from the application 116 can be applied to the data store 110 to generate a query result (e.g., including data from the data stores that is responsive to the query) and the query result can be provided to the application 112. Accordingly, the integrated system 112 enables the extraction of data responsive to the query submitted by the application 116, without requiring explicit information about the data source location from the application 116.

In some implementations, the integrated system 112 uses the provided uniform distributed data model (e.g., the data model 102) as a basis for interpretation of data. The integrated system 112 can include data mapping to provide uniform methods for selecting the queried data. In some implementations, and as noted above, the data model 102 describes the dependencies of the data sets as an ontology, and serves as a structure and syntax for describing the internal data representation. In some implementations, the application 116 has access to global elements of the data model 102. In some implementations, the globally defined elements enable the parameterization of queries for data over the adapters 108*a*, 108*b*, 108*c*. Depending on the nature of the query and the defined relations in the data model 102, all or some data sources 104*a*, 104*b*, 104*c* can be queried.

As discussed herein, an adapter mapping can be provided and enables the integrated system 112 to identify one or more adapters that can be used to query respective data sources. In some examples, the adapter mapping can provide an index of uniform resource indicators (URIs) and can identify an adapter associated with each URI. For example, in response to receiving a query, the integrated system 112 can reference the data model 102 to identify one or more data model elements that are relevant to the query. Each of the identified data model elements is associated with a URI that corresponds to a data source within which instance data for the particular element is provided (e.g., stored). In some examples, a list of URIs is provided and can be used as input to the adapter mapping to identify one or more adapters that can be used to access the data sources.

Figure 3:
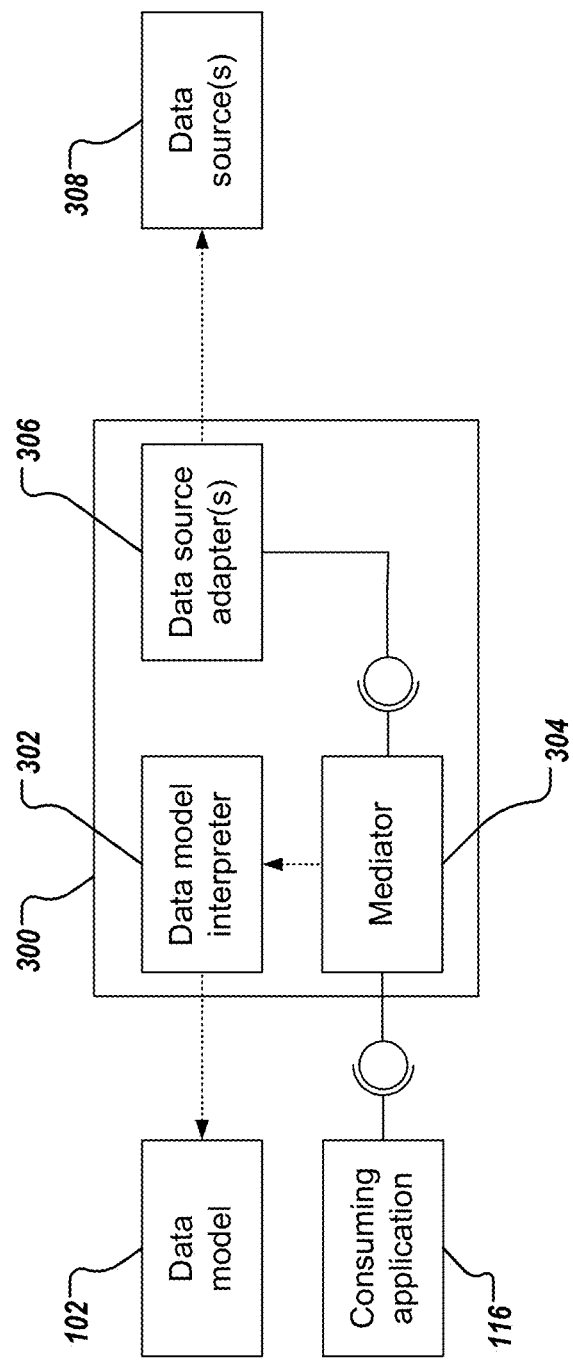
FIG. 3 depicts example components of an integrated system.

FIG. 3 depicts example components of an example integrated system 300. In some implementations, the integrated system 300 includes a plurality of components. Example components include data model interpreter component 302, a mediator component 304 and the one or more adapters 306. Each of the components can be provided as one or more computer programs that can be executed using one or more computing devices. The integrated system 300 connects to the heterogeneous data sources 308 and makes data within the data sources available to one or more applications (e.g., the application 116). In some examples, the mediator component 304 receives the data query from an application. The mediator component 304 uses the data model interpreter component 302 to transform the data model into a process-able form and to resolve the relations provided therein.

In some examples, the data model interpreter component 302 imports the data model and transforms the data model into an internally usable representation (e.g., as business objects). For example, the data model interpreter component 302 can call a method (e.g., readModel(modelname)) to read the ontological data model and to convert the data model into a plurality of business object class instances. The representation of the data model in object form enables simple and direct access to the known attributes during the processing. In some examples, the transformed data model can be stored (e.g., in the data store). In this manner, the transformed data model can be searched based on particular elements (e.g., classes).

Referring again to FIG. 2, an ontological data model (e.g., the data model 102 of FIG. 1) will be described in further detail. In general, data sets from the disparate (e.g., heterogeneous), distributed data sources are to be retrieved (e.g., in response to a query from an application). To achieve this, the relationships between the data can be defined using the ontological data model. In some examples, ontologies can be used to describe domain-specific data structures. Because ontologies explicitly distinguish between classes and instances, ontologies can be used to define a superordinate data model. The class level of an ontology is derived from specific instances and describes the typical properties and relationships of multiple classes. The distributed data sets can be considered as an instance level. Consequently, the ontological data model can define an ordered data structure, which additionally contains internal data dependencies.

Within the ontological data model, a class represents a specific type of data set, whose attributes and relations are provided in the form of the properties of the class. In some examples, properties can be provided as relationships between classes and attributes of a class. The properties connect individual data sets based on existing dependencies and are provided as the atomic elements of a data set. In this manner, and by way of an example use-case, a business object "Order" can be defined as an ontology with an identifier "OrderID" and the attribute "deliveryDate," in which a class with the identifier "Order" is constructed and the associated properties ("OrderID", "deliveryDate") are provided.

Further, the ontological data model can be used to describe the existing relationships between complex data types. These relationships can be defined and separately stored independently from the structural description. This enables automatic resolution of the application-specific relationships in the underlying data sources. The relationships can be provided in the form of properties between defined classes. In this manner, domain-specific data dependencies are describable. By way of an example use-case, example business objects (classes) can be provided as "ProductionProcess", "MaterialList", "Material" and "Order," and the relationships can be provided as "requires," "includes" and "delivered." In this example use-case, a relationship between "ProductionProcess" and "MaterialList" can include "requires," a relationship between "MaterialList" and "Material" can include "includes," and a relationship between "Material" and "Order" can include "delivered", indicating that a production application requires materials identified within a material list, which materials are ordered and delivered for use in the production process.

In general, the description of a target data structure through an ontological data model provides a fundamental precondition for handling the structural heterogeneity of the data source contents. Semantically identical data from different data sources can be queried to different classes based on the descriptions given to the interpretation of data instances, enabling a homogeneous representation and processing of data. In some examples, the data model can be defined using a modeling language. An example modeling language can include the Web Ontology Language (OWL).

Figure 2:
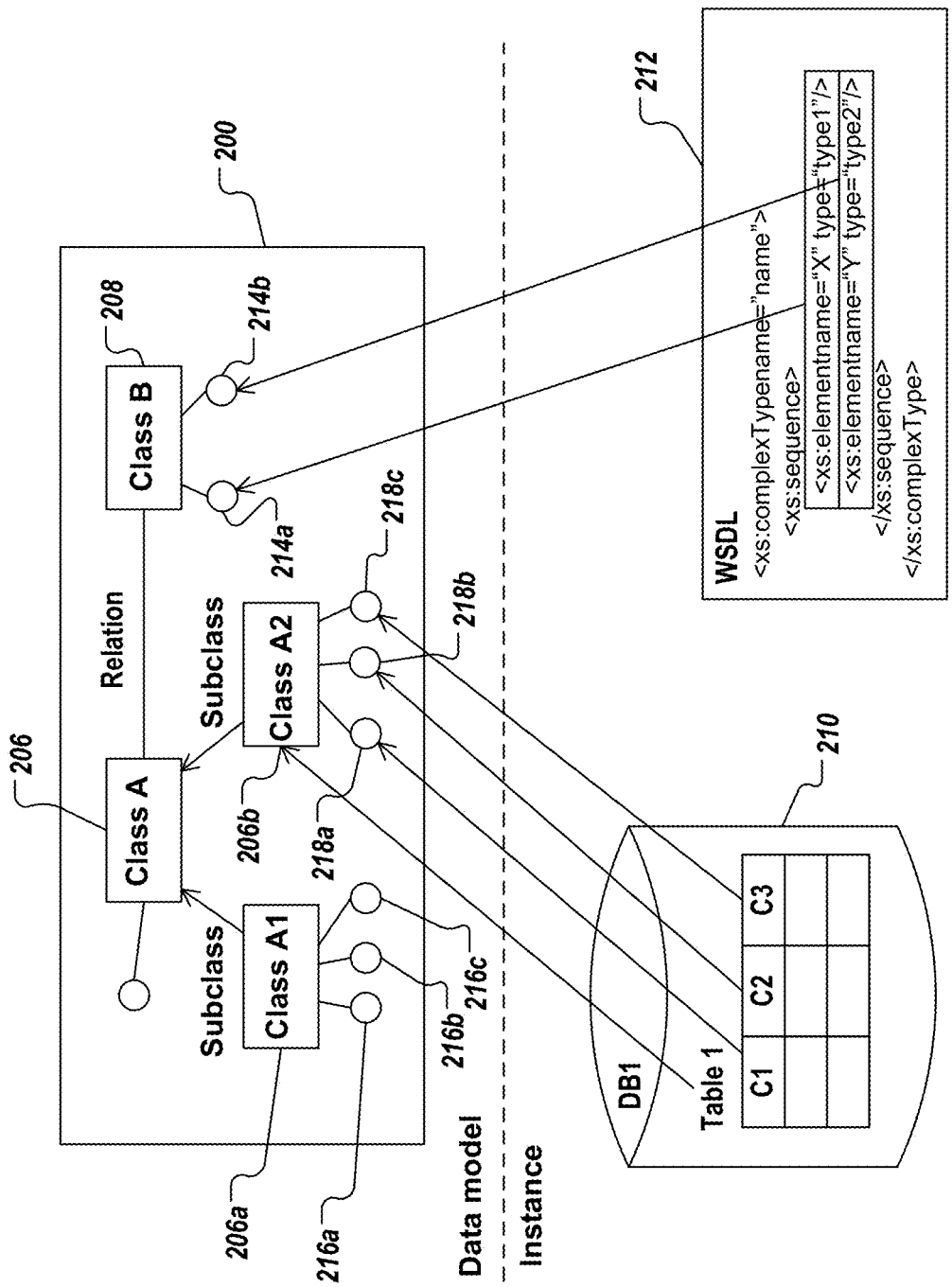
FIG. 2 depicts an example mapping between elements in the data model and elements of the data sources.

FIG. 2 depicts a schematic representation of an example data model 200 including an example correspondence mapping to distributed data sources 210, 212. The example data model 200 includes multiple classes 206, 208 and multiple sub-classes 206a, 206b. In the depicted examples, the class 208 includes associated attributes 214a, 214b, the sub-class 206a includes associated attributes 216a, 216b, 216c, and the sub-class 206b includes associated attributes 218a, 218b, 218c. The example data model 200 further defines relationships between classes. In the depicted example, "Relation" defines a relationship, or dependency, between the class 206 and the class 208. In the depicted example, the data sources 210, 212 are provided as instances of the data model 200. In this approach, the distributed data sets within the data sources 210, 212 are considered as an instance level. In this manner, the data model 200 defines a target data structure for the interpretation of the contents of the distributed data sources 210, 212.

In some implementations, the example data model 202 describes complex data sets in the form of the classes 206, 208, the class 206 including the sub-classes 206a, 206b. In the example data model 200, a class can represent a particular record type, and the attributes and relationships of a class can be properties of the class. The properties can relate an individual data source to a class and/or sub-class according to existing dependencies. In the depicted example, the data of the data source 210 (provided as entries in a database table (Table 1)) are interpreted as instances of the sub-class 206b, and the data of the data source 212 (provided as entries in a database table (Table 2)) are interpreted as instances of the class 208.

In some implementations, the example data model 200 can be designed for a particular application, or use-case. For example, the example data model 200 can be designed to assist a business process. A class of the business data model can be a business order. The business order class can be identified by a purchase order ID and the attribute of the business order class can be delivery. In the example use-case, the class 208 can represent a business object "Order" that can be defined based on the attribute 214a provided as an order identifier "OrderID" and the attribute 214b provided as an order delivery date "deliveryDate."

As discussed herein, a modular adapter concept is provided to enable an integrated system (e.g., the integrated system 112 of FIG. 1) to overcome the heterogeneity of the distributed data sources and provide a unified representation of the distributed data to applications (e.g., the application 116 of FIG. 1). The adapters provide configurable connections with the data sources. In some examples, each adapter is specific to a data source type, and enables setting of connection parameters and authorization data to ensure the customization of application-specific factors. In some examples, parameters can be configured using an interface. In this manner, the address of a corresponding data source (e.g., uniform resource indicator (URI)), particular characteristics and/or appropriate authentication data can be provided for establishing the connection with the data source. The adapters provide the element mapping of the data model with the corresponding data sources (depicted in FIG. 2). A successful query results in the appropriate data model elements being provided with adequate values from the data source represented in the uniform format (e.g., RDF).

The adapters provide a generic solution to handling distributed, heterogeneous data sources. Initially, the atomic elements of the associated data sources are interrogated, are mapped to elements of the unified data model (e.g., the data model 102 of FIG. 1), and are stored in the form of a schema mapping of the adapter. The adapter uses the schema mapping in order to correctly represent the data queries. The schema mapping is adapter-specific. In some examples, a data expert (specific to the corresponding data source) constructs the schema mapping and ensures that the semantic and structural heterogeneous data can be standardized. In this manner, the elements of the unified data model (which functions as the schema for the entire integrated data inventory) are correlated with the atomic schema elements of the underlying data sources. By way of non-limiting example, a data source can include a relational database that stores data in tables. A schema mapping establishes in which table and column a particular element of the data model can be found (e.g., schematically depicted in FIG. 2).

In some implementations, an adapter includes a plurality of components. Example components can include an adapter interface component, an abstract adapter component and one or more data source-specific adapter components (e.g., database adapter, web service adapter). In some examples, the adapter components define a unitary interface that enables querying of data from the heterogeneous data sources independent from their source and distribution. In some examples, the adapter interface component defines a plurality of methods provided by the interface, the methods including pre-defined return data types. The abstract adapter component enables definition of the standard elements of the adapter. In some examples, the data structure for the schema mapping and the plurality of atomic schema elements can be instantiated through the abstract adapter class.

The schema mapping and correct setting of the physical connection to the data source enable the integrated system to query the data content in a simplified manner.

An example data extraction from a data source using an adapter will be discussed. As discussed in further detail herein, the adapter queries the corresponding data source through an interface and provides a query result. More particularly, an integrated system (e.g., the integrated system 112 of FIG. 1) receives a query (e.g., from the application 116 of FIG. 1), and selects one or more adapters for querying respective one or more data sources. A selected adapter is specific to a type of the data source (e.g., a SQL database). The adapter communicates with the data source using the interface. In some examples, the interface is provided as a data-source specific application programming interface (API). In some examples, a specialized interface can identify the location of particular data elements within the data source.

In operation, the integrated system formulates a query on the data source and uses the methods, as well as the provided element mappings, provided by the adapter. The adapter handles the communication with the data source using the appropriate communication protocol. In some examples, the adapter interprets the query and queries requested data from the data source using the native query mechanism of the particular data source type. In the depicted example, the data source can be provided as a relational database (e.g., a SQL database) and can query the data source using a SQL query. The adapter arranges the data values returned from the data source into appropriate elements of the system query and returns the data values in a defined representation (e.g., RDF). In the depicted example, the query result includes the returned data values in RDF format. A similar process would be using Web Service by mapping elements of the WSDL document to data model elements.

Figure 4:
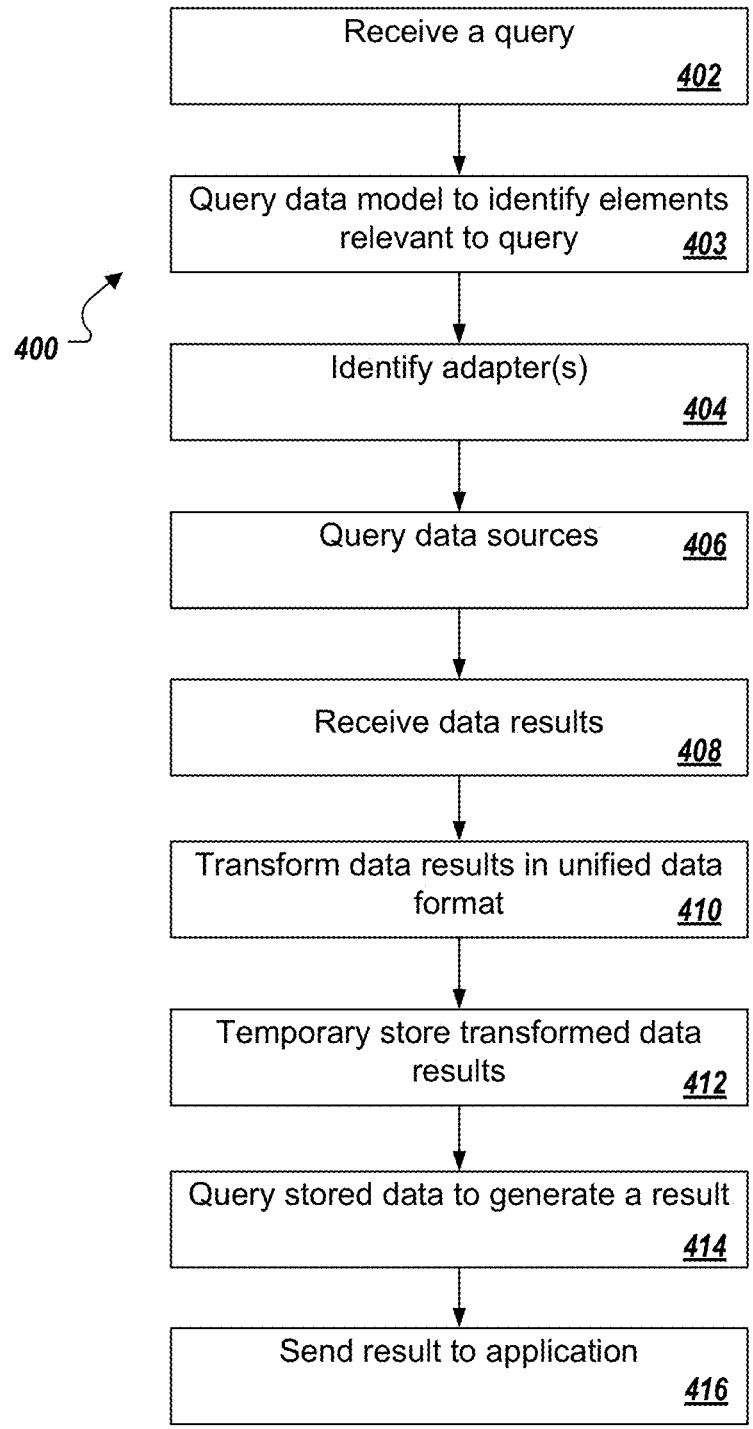
FIG. 4 depicts an example process that can be executed in accordance with implementations of the present disclosure.

FIG. 4 is a flowchart depicting an example process 400 that can be executed in accordance with implementations of the present disclosure. In some implementations, the example process 400 can be executed as one or more computer applications using one or more computing devices.

A query is received (402). For example, an application (e.g., the application 116 of FIG. 1) can submit a query (e.g., to the integrated system 112 of FIG. 1). A data model is accessed to identify one or more data model elements that are relevant to the query (403). For example, the integrated system 112 can access the data model 102 to identify one or more elements of the data model 102 that are relevant to the query. Adapters corresponding to data requested in the query are identified (404). For example, the integrated system 112 can identify one or more adapters based on the one or more data model elements that were identified as being relevant to the query. In some examples, each of the identified data model elements is associated with a URI to provide a list of URIs. The list of URIs can be provided as input to an adapter mapping, and the one or more adapters can be identified from the adapter mapping. One or more data sources are queried (406). For example, each adapter of the one or more adapters can interpret the query and can query respective data sources in a native query format. Data results are received (408). For example, each adapter receives data values in response to the submitted native query. Each data result is transformed into a unified data format to provide transformed data results (410). For example, each adapter transforms native data results into the unified data format (e.g., RDF). The transformed data results are stored in a temporary data store (412). For example, the integrated system 112 can receive the transformed data results from each of the one or more adapters and can store the transformed data results in the temporary data store 110. The temporary data store is queried based on the query to generate a result (414). For example, the integrated system 112 can query the temporary data store 110 based on a query (e.g., the originally received query) to generate a result, and can provide the result to the application 116 (416).

Figure 5:
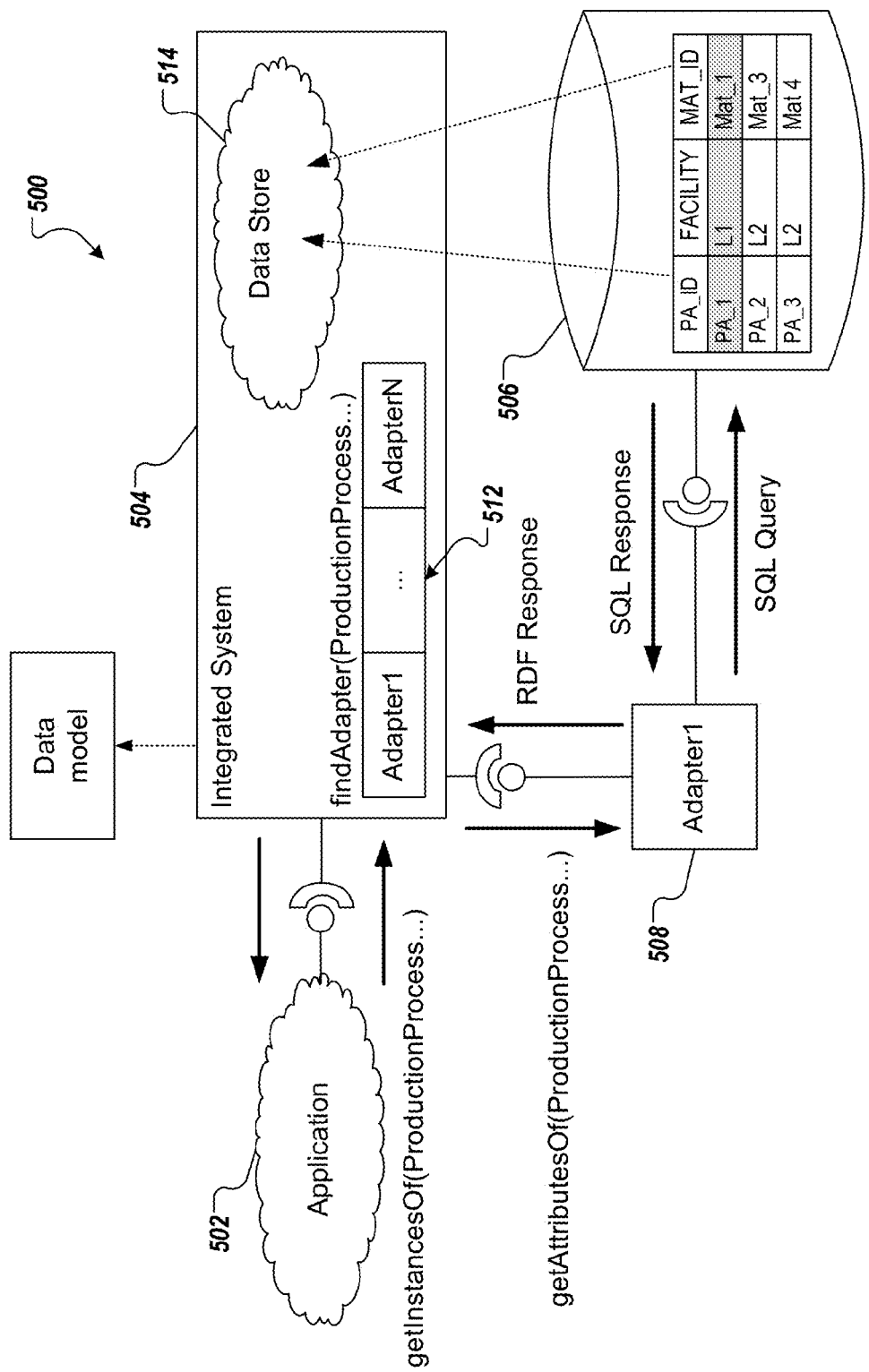
FIG. 5 depicts an example use case in accordance with implementations of the present disclosure.

FIG. 5 illustrates an example execution 500 in accordance with implementations of the present disclosure. The example execution 500 includes an application 502 requesting data from an integrated system 504, the integrated system mediating a data request between the application 502 and a data source 506 through an adapter 508. Although not depicted in FIG. 5, the data source 506 can be one data source of a plurality of data sources. In the depicted example, the data source 506 is provided as a relational database (e.g., an SQL database).

The application sends a query to the integrated system 504. As depicted, an example query can include a request to retrieve instances of a particular object class (e.g., getInstancesOf(Contract)). That is, the query is submitted using a defined method that transfers the sought class indicator (e.g., Contract). The integrated system 504 references a schema mapping 512 (discussed above) to identify appropriate adapters for retrieving the requested data. The schema mapping 512 provides a plurality of adapters, each adapter corresponding to a specific data source. In some examples, the integrated system 504 compares mapped data model structures with the sought class attributes. In this manner, only adapters that also contain the actually required class elements are identified. In the depicted example, the adapter 508 is identified as the appropriate adapter from the schema mapping 512 for retrieving the data.

The integrated system 504 provides the query to the selected adapter 508 using a defined interface method (e.g., getAttributesOf(Contracts)). The adapter 508 extracts the necessary data from the data source 506 using a data source-specific query method. In the depicted example, the adapter 508 extracts the required data from the data source 506 using one or multiple SQL queries. In response to the data source-specific query method, the data source 506 provides a response to the adapter 508, the response being provided in a format specific to the data source 508. The adapter 508 transforms the response to provide a transformed response in a unitary data format (e.g., RDF) and provides the transformed response to the integrated system 504. The integrated system 504 stores the transformed response in a data store 514 (e.g., RDF-store). For example, the integrated system 504 stores the data in the transformed response in triple-format within the data store 514.

After all of the available adapters have been searched and all transformed responses have been received and stored, the integrated system 504 extracts the requested instance data from the data store 514. In some examples, the integrated system 504, queries the data store 514 using a query (e.g., SPARQL query) and provides the query results to the application 502. In some examples, the query used to query the data store 514 is the same query as originally submitted by the application 514.

It is appreciated that the example of FIG. 5 is a relatively simple example to ease in understanding aspects of the present disclosure. It is also appreciated that implementations of the present disclosure can be applied in more complex scenarios. For example, a query from the application 502 can be relevant to objects that are dependent on one another. In the example provided above, production processes/material, lists/materials and material orders can be provided as connected objects (i.e., dependent objects). An example query can be directed to production processes that are dependent on a material order. In response to such a query, the data model is queried (i.e., by the integrated system 504), and a list of relevant elements/objects (e.g., Production process, Material list, Material, Order) is returned. For each of object, the example process discussed above with reference to FIG. 5 is executed (e.g., getInstancesof(ProductionProcess, . . . )) to identify adapters, which can provide the instances of these objects stored in the underlying data sources. The adapters submit queries and/or data calls to the connected data sources to retrieve the relevant instance data, which is stored in the temporary data store (e.g., data store 514). The temporary data store can be queried with the original query and the results can be provided to the querying application (e.g., application 502). An example advantage is that dependencies or other relations between objects do not have to be known to the querying application, and are automatically resolved through the definitions in the overall data model.

Figure 6:
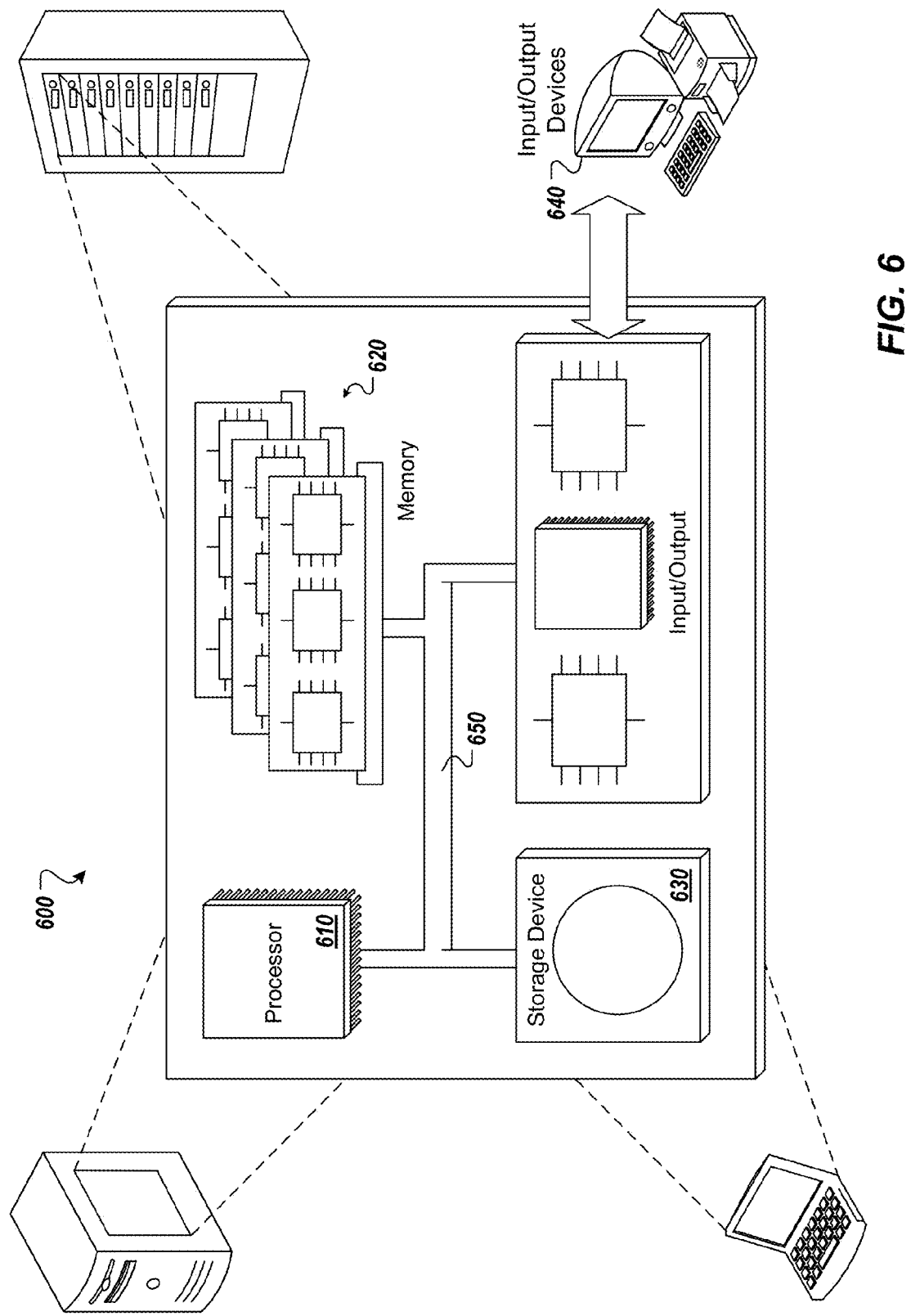
FIG. 6 is an illustration of example computer systems that can be used to execute implementations of the present disclosure.

Referring now to FIG. 6, depicts an example computing system 600. The system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In some implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In some implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In some implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of querying distributed data sources, the method being executed using one or more processors and comprising:
   receiving, by one or more processors, a query;
   identifying, by the one or more processors and based on the query, one or more relevant elements from an overall data model stored in computer-readable memory, the overall data model specifying relationships between classes, sub-classes and attributes, each relevant element being an element of the overall data model and being determined to be relevant to the query;
   identifying, by the one or more processors and using an adapter mapping, one or more adapters based on the one or more relevant elements, the adapter mapping associating each relevant element with a particular adapter, each adapter providing credentials for authenticating and authorizing access to the one or more data sources, and at least one adapter comprising a generic adapter configured to be specific to a data source type of the one or more data sources based on one or more configurations to associate data provided in a respective data source to the overall data model;
   querying, by the one or more processors and using the one or more adapters, one or more data elements in heterogeneous data sources of the disparate data sources, each adapter being specific to a data source of the one or more data sources;
   in response to querying, receiving, at the one or more adapters, one or more data results;
   transforming, by the one or more processors, each data result of the one or more data results into a unified data format to provide respective one or more transformed data results;
   storing the one or more transformed data results in a temporary data store; and
   querying the temporary data store based on the query to generate a result.

2. The method of claim 1, wherein the data model is provided as an ontology and comprises a plurality of interconnected data elements, data associated with each data element being provided in a respective data source of the disparate data sources.

3. The method of claim 1, wherein the data model is processed to provide a usable representation.

4. The method of claim 3, wherein processing of the data model comprises converting the data model into a plurality of business object class instances.

5. The method of claim 1, wherein the adapter mapping maps the one or more adapters to respective one or more data model classes identified from the query.

6. The method of claim 1, wherein each adapter is connected to a mediator component and an interpreter component that are configured to transform the overall data model into a processable form.

7. The method of claim 1, wherein the one or more configurations are provided in a configuration file.

8. The method of claim 1, wherein the one or more configurations identify a location of a respective data source, to which the respective adapter is specific.

9. The method of claim 1, wherein the credentials comprise a username and a password.

10. The method of claim 1, wherein the unified data format comprises resource description framework (RDF) format and the temporary data store comprises an RDF data store.

11. The method of claim 1, wherein the disparate data sources comprise one or more of an RDF data source that stores data in RDF format, an extensible mark-up language (XML) data source that stores data in XML format, a web service (WS) data source that stores data provided web service description language (WSDL) and a relation database that stores data in one or more tables.

12. The method of claim 1, wherein the query is provided as a SPARQL query.

13. The method of claim 1, wherein the temporary data store is queried using the query.

14. The method of claim 1, wherein each adapter generates a data source—specific query and queries a respective data source using the data source—specific query.

15. The method of claim 1, further comprising providing the result to querying computer-executed application that submitted the query.

16. The method of claim 1, wherein identifying, using the adapter mapping, one or more adapters based on the relevant elements comprises:
   for each relevant element of the one or more relevant elements, identifying one or more data source locators to provide a list of data source locators;
   providing the list of data source locators as input to the adapter mapping; and
   receiving a list of adapters from the adapter mapping, the list of adapters including the one or more adapters.

17. The method of claim 16, wherein the data source locators comprise uniform resource indicators (URIs).

18. The method of claim 16, wherein the adapter mapping comprises an index associating adapters to respective data source locators.

19. A non-transitory computer-readable storage medium coupled to one or more processors and having instructions stored thereon which, when executed by the one or more processors, cause the one or more processors to perform operations comprising:
   receiving a query;
   identifying, based on the query, one or more relevant elements from an overall data model stored in computer-readable memory, the overall data model specifying relationships between classes, sub-classes and attributes, each relevant element being an element of the overall data model and being determined to be relevant to the query;
   identifying, by the one or more processors and using an adapter mapping, one or more adapters based on the one or more relevant elements, the adapter mapping associating each relevant element with a particular adapter, each adapter providing credentials for authenticating and authorizing access to the one or more data sources, and at least one adapter comprising a generic adapter configured to be specific to a data source type of the one or more data sources based on one or more configurations to associate data provided in a respective data source to the overall data model;
   querying, using the one or more adapters, one or more data elements in heterogeneous data sources of a plurality of disparate data sources, each adapter being specific to a data source of the plurality of data sources;
   in response to querying, receiving, at the one or more adapters, one or more data results;
   transforming each data result of the one or more data results into a unified data format to provide respective one or more transformed data results;
   storing the one or more transformed data results in a temporary data store; and querying the temporary data store based on the query to generate a result.

20. A system, comprising:
a computing device; and
a computer-readable storage device coupled to the computing device and having instructions stored thereon which, when executed by the computing device, cause the computing device to perform operations comprising:
receiving a query;
identifying, based on the query, one or more relevant elements from an overall data model stored in computer-readable memory, the overall data model specifying relationships between classes, sub-classes and attributes, each relevant element being an element of the overall data model and being determined to be relevant to the query;
identifying, by the one or more processors and using an adapter mapping, one or more adapters based on the one or more relevant elements, the adapter mapping associating each relevant element with a particular adapter, each adapter providing credentials for authenticating and authorizing access to the one or more data sources, and at least one adapter comprising a generic adapter configured to be specific to a data source type of the one or more data sources based on one or more configurations to associate data provided in a respective data source to the overall data model;
querying, using the one or more adapters, one or more data elements in heterogeneous data sources of a plurality of disparate data sources, each adapter being specific to a data source of the plurality of data sources;
in response to querying, receiving, at the one or more adapters, one or more data results;
transforming each data result of the one or more data results into a unified data format to provide respective one or more transformed data results;
storing the one or more transformed data results in a temporary data store; and
querying the temporary data store based on the query to generate a result.

* * * * *